United States Patent [19]

Hanson

[11] 4,153,823
[45] May 8, 1979

[54] TELEPHONE LOCK

[76] Inventor: Maurice J. Hanson, 16400 Saybrook Lane, Space #98, Huntington Beach, Calif. 92649

[21] Appl. No.: 922,291

[22] Filed: Jul. 6, 1978

[51] Int. Cl.² ............................................. H04M 1/66
[52] U.S. Cl. ............................................... 179/189 R
[58] Field of Search ................................... 179/189 R

[56] References Cited
U.S. PATENT DOCUMENTS 3,301,969  1/1967  Darling et al. .................. 179/189 R
4,081,630  3/1978  Washburn et al. ............... 179/189 R Primary Examiner—Thomas W. Brown
Attorney, Agent, or Firm—Edward E. Roberts

[57] ABSTRACT

A telephone lock having a base portion configured for being received within the finger grip cavity of the telephone base, the lock having a portion hinged to the base portion, the hinged portion encircling the handset, the hinged portion having a free end with an aperture therein for aligning with an aperture in the base portion of the lock for receiving a lock member.

5 Claims, 4 Drawing Figures

U.S. Patent May 8, 1979 4,153,823
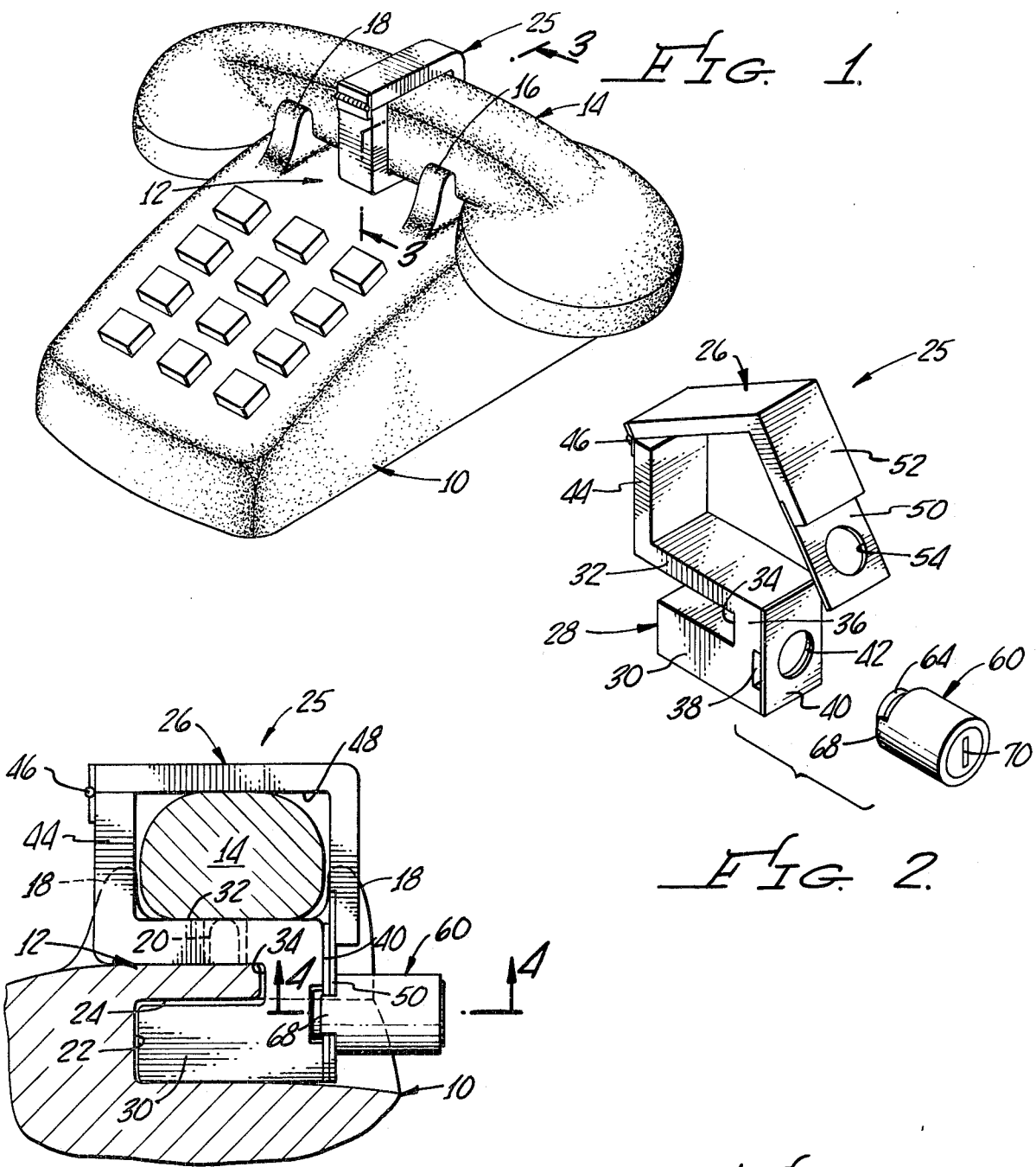

TELEPHONE LOCK

BACKGROUND OF THE INVENTION

The background of the invention will be discussed in two parts:

FIELD OF THE INVENTION

This invention relates to telephone locks and more particularly to a telephone locking apparatus for retaining the handset of the telephone on the cradle thereof.

DESCRIPTION OF THE PRIOR ART

Prior art telephone locking apparatus for dial type telephones are well known, such apparatus including a locking member for engaging a finger hole in the dial.

With the rapid advent of pushbutton dialing of telephones, many other types of locking apparatus have been devised, some of which have a portion configured for retaining the hook switch plungers in the depressed position for disabling the circuitry, some such devices being shown in U.S. Pat. Nos. 2,641,659; 3,598,931; 3,624,317; 3,712,964; 3,723,671; 3,823,277; and 3,939,678.

Other telephone locking apparatus for locking the cradle in position are shown for example in U.S. Pat. No. 2,864,906 which utilize a generally C-shaped clamp mechanism for retaining the handset on the receiver; U.S. Pat. No. 3,301,969 which locks the handset within the cradle by means of a main body member engaging the finger grip cavity with a jaw-type member pivotally coupled thereto for engaging a portion of the handset; and U.S. Pat. No. 3,469,041 which depicts a sheet metal telephone lock having a portion configured for fitting within the telephone finger cavity with a hingedly coupled generally L-shaped member gripping the upper surface of the telephone handset with a lock provided thereon for co-acting with a latch portion on the finger grip engaging portion of the lock.

Accordingly, it is an object of the present invention to provide a new and improved telephone locking apparatus.

It is another object of the present invention to provide a new and improved telephone locking apparatus having a portion thereof encircling the handset of the telephone.

SUMMARY OF THE INVENTION

The foregoing and other objects of the invention are accomplished by providing a lock having a first or base portion configured for engaging the finger grip cavity of the telephone base with a second portion hingedly coupled thereto, the base portion and hinged portion being configured for encircling the handset with the free end of the hinged portion having an aperture therein aligning with an aperture in the base portion of the lock for receiving a lock.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a perspective view of a pushbutton telephone having the locking apparatus according to the invention assembled thereon;

FIG. 2 is an exploded perspective view of the telephone locking apparatus according to the invention;

FIG. 3 is a side view, partially in cross-section, illustrating the telephone locking apparatus in assembled position on the telephone; and FIG. 4 is a sectional view taken generally along line 4—4 of FIG. 3.

DESCRIPTION OF THE PREFERRED EMBODIMENT

Referring now to the drawings and particularly to FIG. 1 there is shown a push button dialing telephone of conventional configuration having a telephone base generally designated 10 with a cradle portion generaly designated 12 having a handset generally designated 14 mounted thereon, the handset 14 being received within the cradle 12 which is configured with two pairs of upwardly extending arms 16 and 18 (only one of each arms being shown). The configuration of the cradle 12 is such that the handset 14 is spaced from the plane of the cradle 12 a distance sufficient to permit gripping the handset by the user. Referring also to FIG. 3, as shown in dotted lines, the upwardly extending arms 18 are spaced and contoured to receive the handset 14 with little lateral movement. Positioned between the arms 18 and generally centrally relative thereto is a depressible hook switch plunger 20, the plunger 20 being a part of the conventional telephone, the depression of which renders the telephone dialing circuits inoperative. As illustrated in FIG. 3, the telephone base 10 is provided with a finger grip cavity 22 which is inwardly extending directly beneath the plane of the cradle 12, the cavity 22 being separated from the plane of the cradle 12 by means of an interconnecting web portion 24 which is of relatively small thickness.

A telephone lock apparatus generally designated 25 (see also FIGS. 1 and 2) is provided with a first or base portion generally designated 28 and a hinged portion generally designated 26. The base portion 28 has a generally C-shaped portion with one arm 30 thereof configured for engagement within the cavity 22 with the other arm 32 thereof being configured for abuttingly engaging the surface of the cradle 12 with the thickness of the arm 32 being slightly less than the spacing between the plane of the cradle 12 and the adjacent surface of the handset 14 when resting thereon. The spacing between the arms 30 and 32 is slightly greater than the thickness of the interconnecting web portion 24 adjacent cradle 12 with the length of the recess 34 between the arms 30 and 32 being slightly greater than the length of the web portion 24. The two arms 30 and 32 are interconnected by an integral portion 36 which is provided on the outer surface thereof with a cutaway or recess 38 (see also FIG. 4). The outer surface of interconnecting portion 36 is generally planar and has suitably secured thereto, such as by adhesive or screws, a metallic plate member 40 having a generally centrally located aperture 42 therein, the aperture 42 being configured for communication with the recess 38, which extends to the outer edge of the integral portion 36 of base portion 28.

As best illustrated in FIGS. 2 and 3, the C-shaped portion of the base portion 28 has an upwardly extending leg 44 integral therewith, the leg 44 being generally perpendicular to the arm 32. At the terminal end of leg 44, a hinge 46 is secured thereto for receiving the generally L-shaped hinge member 26 with the configuration being such that with the hinged portion 26 in the closed position illustrated in FIG. 3, an enlarged opening 48 is formed having dimensions sufficient for receiving the hand gripping portion of the handset 14 in close spaced proximate relation, thereby completely encircling the handset 14. The terminal end of the L-shaped hinged member 26 is provided with a reduced thickness tab portion 50, the dimensions of which are approximately the same as the dimensions of the locking plate 40. The tab 50 may be formed integrally with the hinged portion 26 or may be a separate metallic piece suitably secured to the inner surface of one arm 52 of the L-shaped hinged member 26. In either event, the tab portion 50 is provided with a generally centrally disposed aperture 54 having a diameter generally equal to the diameter of the aperture 42 in locking plate 40. The overall dimensions of the member 26 enable the tab portion 50 to be positioned in abutting aligned relation with the locking plate 40 with the handset 14 positioned within the opening 48 of the locking apparatus 25.

A lock generally designated 60 is provided for locking the hinged portion 26 to the base portion 28, the lock 60 being a rotary dial lock having a generally cylindrical barrel with a centrally disposed generally circular stub portion 62 having a diameter slightly smaller than the diameter of the apertures 42 and 54. Rotatably mounted on the planar surface of the stub portion 62 is a generally disc-shaped locking member 64 having generally the same diameter as the diameter of the stub portion 62, the locking member 64 being mounted off-center for rotation about an axis 66 offset from the center of stub portion 62. The housing of the rotary dial lock 60 has an indexing projection 68 extending in the same direction as the stub portion 62 but spaced therefrom, the projection 68 being configured for abutting against one edge of the tab 50 and locking plate 40 when in aligned abutting relation as illustrated in FIG. 4. The indexing projection 68 is provided to prevent rotation of the rotary dial lock 60 when a key is inserted therein for locking or unlocking the lock 60.

While the hinged coupling provided by hinge 46 is illustrated to be at the terminal end of leg 44, alternately the hinged portion 26 may be generally C-shaped rather than L-shaped with the hinging being provided at the other end of leg 44 at the junction thereof with arm 32 of base portion 28. In either event, to utilize the telephone locking apparatus 26, with the handset 14 removed from the telephone base 10, the arm 30 is inserted within the finger grip cavity 22. With the hinged portion 26 open, the handset 14 is then returned to the cradle 12 thereby depressing the hook switch plungers 20 as illustrated in FIG. 3. The hinged portion 26 is then rotated until the tab portion 50 thereof is in abutting aligned relation with the locking plate 40 whereupon the lock 60 is positioned with the indexing projection 68 abutting against the edges of tab 50 and plate 40 with the stub portion 62 and the normally aligned disc 64 passing through the aligned apertures 54 and 42 respectively. With the disc 64 within recess 38 a key (not shown) is then inserted into the key slot 70 of lock 60 whereupon it is rotated until the disc 64 is in the position shown in FIG. 4, that is, out of alignment with aperture 42 with a portion of disc 64 extending beyond the edge of aperture 42 for thereby locking the apparatus. In this position, the handset 14 is completely encircled by the telephone locking apparatus 25 within opening 48 as shown in FIG. 3 thereby preventing dislodgement of the handset 14 from the cradle 12, thus maintaining the hook switch plungers 20 in the depressed condition for rendering the telephone dialing circuit inoperative. As a consequence, with this complete encirclement, the handset 14 is captively retained in position, cannot be rotated or dislodged even slightly, thus maintaining a secure locking position. The telephone locking apparatus 25 according to the invention may be conveniently molded in two parts of metallic material if desired or of plastic materials or the like with a minimum of assembly and machining required. In cross section, each arm or leg or interconnecting portion is relatively bar-shaped with an overall width that may be approximately one-half to one inch with a minimum of bulk. Furthermore, although not as convenient, the member 26 and base portion 28 may be provided with separable interlocking portions rather than a hinge.

While there has been shown and described a preferred embodiment, it is to be understood that various other adaptations and modifications may be made within the spirit and scope of the invention.

What is claimed is:

1. In a telephone locking apparatus for a telephone having a base with a finger gripping cavity adjacent the cradle portion thereof with an interconnecting web portion, the cradle being configured for receiving a handset, the combination comprising:

a first member having a generally C-shaped portion with one arm thereof configured for engaging within the finger gripping cavity and the other arm thereof in generally abutting relation with the opposite surface of the interconnecting web portion;

a second member movably coupled to said first member, said second member having a generally L-shaped portion, said first and second members in assembled relation defining an opening for receiving therein and completely encircling the hand gripping portion of the handset; and coacting means on one end of said L-shaped portion and a surface of said first member for receiving means for locking said first member relative to said second member whereby to retain the handset within the cradle of the telephone.

2. The combination according to claim 1 wherein said first member has a leg portion integral with one arm of said C-shaped portion and said second member is generally L-shaped and hingedly coupled to the free end of said leg portion.

3. The combination according to claim 2 wherein said coacting means includes a locking plate on a surface of the interconnecting portion of said C-shaped portion and a coacting tab portion on the free end of said second member.

4. The combination according to claim 3 wherein said tab portion and said locking plate have generally identical apertures extending therethrough and said interconnecting portion is provided with a recess adjacent said locking plate, said apertures when aligned being configured for receiving a lock.

5. The combination according to claim 4 wherein said apparatus further includes a lock having a stub portion configured for extending through said apertures, said lock including a lock member movable within said recess for locking said tab portion and said locking plate in aligned abutting relation.

* * * * *